United States Patent
Kajiwara et al.

(10) Patent No.: US 12,197,156 B2
(45) Date of Patent: Jan. 14, 2025

(54) POLYMER FILM, TUBULAR FIXING MEMBER, FIXING DEVICE, AND IMAGE FORMING APPARATUS

(71) Applicant: FUJIFILM Business Innovation Corp., Tokyo (JP)

(72) Inventors: Kenji Kajiwara, Kanagawa (JP); Hiroaki Tanaka, Kanagawa (JP); Ryohei Yoshikawa, Kanagawa (JP); Taiki Nagamatsu, Kanagawa (JP); Tomotake Inagaki, Kanagawa (JP); Masayuki Seko, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/491,828

(22) Filed: Oct. 23, 2023

(65) Prior Publication Data

US 2024/0353782 A1 Oct. 24, 2024

(30) Foreign Application Priority Data

Apr. 19, 2023 (JP) .................. 2023-068797

(51) Int. Cl.
*G03G 15/20* (2006.01)
*C08K 3/04* (2006.01)
(Continued)

(52) U.S. Cl.
CPC .......... *G03G 15/206* (2013.01); *C08K 3/041* (2017.05); *G03G 15/0121* (2013.01);
(Continued)

(58) Field of Classification Search
CPC .......... G03G 15/0121; G03G 15/0216; G03G 15/0808; G03G 15/2017; C08K 3/041
(Continued)

(56) References Cited

U.S. PATENT DOCUMENTS

| 2012/0285674 A1 | 11/2012 | Hirano |
| 2012/0286194 A1 | 11/2012 | Hirano |
| 2014/0153986 A1 | 6/2014 | Muramatsu |

FOREIGN PATENT DOCUMENTS

| CN | 100378595 | * | 4/2008 |
| EP | 2865722 | | 4/2015 |

(Continued)

OTHER PUBLICATIONS

Hongyu Chen et al., "Thermal conductivity of polymer-based composites: Fundamentals and applications," Progress in Polymer Science, vol. 59, Aug. 2016, pp. 41-85.
(Continued)

*Primary Examiner* — Hoan H Tran
(74) *Attorney, Agent, or Firm* — JCIPRNET

(57) ABSTRACT

A polymer film includes at least one type of polymer selected from the group consisting of a resin and rubber and fillers dispersed in the polymer; in which in a case where the polymer film is three-dimensionally analyzed with FIB-SEM, a film thickness of the polymer film is denoted by Tm, and a length of the filler in a film thickness direction of the polymer film is denoted by Lf, a proportion of the number of fillers having Lf/Tm of 0.01 or more and less than 1.0 to the number of all the fillers is more than 40% and less than 100%.

20 Claims, 4 Drawing Sheets

(51) Int. Cl.
*G03G 15/01* (2006.01)
*G03G 15/02* (2006.01)

(52) U.S. Cl.
CPC ..... *G03G 15/0216* (2013.01); *G03G 15/2017* (2013.01); *G03G 2215/00413* (2013.01)

(58) Field of Classification Search
USPC ................................ 399/122, 320, 328, 329
See application file for complete search history.

(56) References Cited

FOREIGN PATENT DOCUMENTS

| | | | |
|---|---|---|---|
| JP | 5665846 | | 2/2015 |
| JP | 2017098376 | | 6/2017 |
| JP | 2018090768 | * | 6/2018 |
| WO | 2011111684 | | 9/2011 |

OTHER PUBLICATIONS

"Search Report of Europe Counterpart Application", issued on Apr. 5, 2024, p. 1-p. 9.

* cited by examiner

POLYMER FILM, TUBULAR FIXING MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2023-068797 filed Apr. 19, 2023.

BACKGROUND

(i) Technical Field

The present disclosure relates to a polymer film, a tubular fixing member, a fixing device, and an image forming apparatus.

(ii) Related Art

WO2011/111684A discloses a thermally conductive laminate that includes an insulating layer and a metal layer. The insulating layer includes at least one filler-containing polyimide resin layer containing thermally conductive fillers in a polyimide resin, and the metal layer is laminated on one or both surfaces of the insulating layer. The content of the thermally conductive fillers in the filler-containing polyimide resin layer is 35 to 80 vol %, the maximum particle size of the thermally conductive filler is less than 15 μm, the thermally conductive fillers include plate-like fillers and spherical fillers, an average major diameter DL of the plate-like fillers is 0.1 to 2.4 μm, and the thermal conductivity λz of the insulating layer in a thickness direction is 0.8 W/m·K or more.

SUMMARY

Aspects of non-limiting embodiments of the present disclosure relate to a polymer film that is excellent in thermal conductivity in a film thickness direction as compared to a case where a proportion of the number of fillers having Lf/Tm of 0.01 or more and less than 1.0 to the number of all fillers is 40% or less.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-mentioned object includes the following aspects.

According to an aspect of the present disclosure, there is provided a polymer film including at least one type of polymer selected from the group consisting of a resin and rubber, and fillers dispersed in the polymer, in which in a case where the polymer film is three-dimensionally analyzed with FIB-SEM, a film thickness of the polymer film is denoted by Tm, and a length of the filler in a film thickness direction of the polymer film is denoted by Lf, a proportion of the number of fillers having Lf/Tm of 0.01 or more and less than 1.0 to the number of all the fillers is more than 40% and less than 100%.

BRIEF DESCRIPTION OF THE DRAWINGS

Exemplary embodiment(s) of the present invention will be described in detail based on the following figures, wherein.

DETAILED DESCRIPTION

Figure 1:
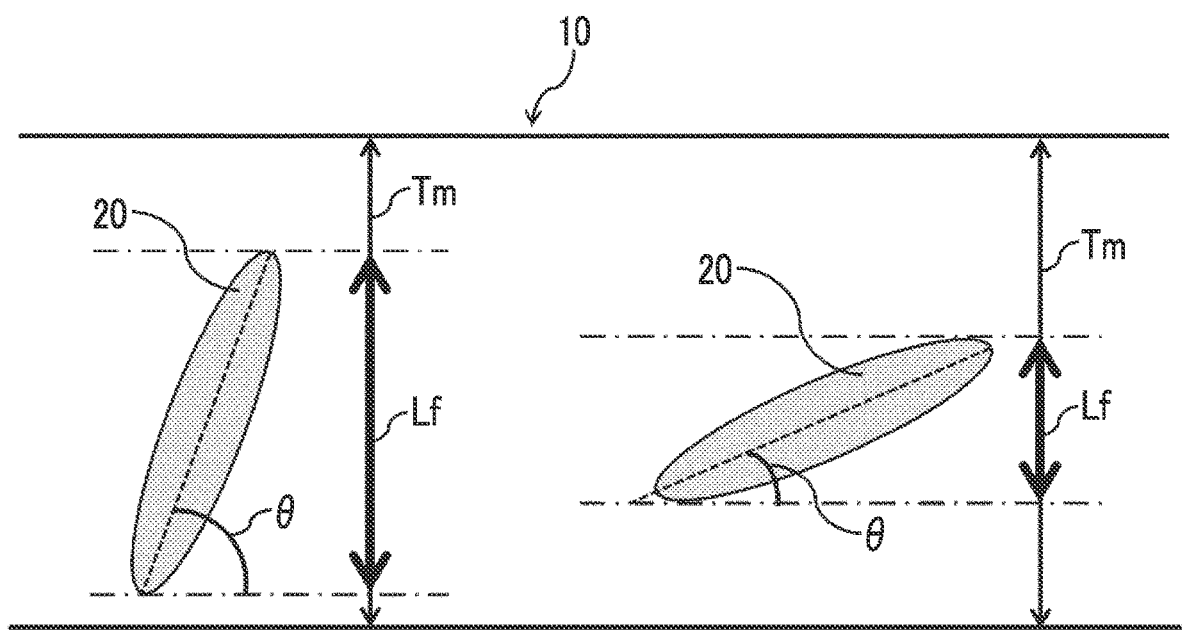
FIG. 1 is a schematic diagram illustrating Lf, Tm, and an angle θ of a filler.

Exemplary embodiments of the present disclosure will be described below. The description and examples of these exemplary embodiments illustrate the exemplary embodiments and do not limit the scopes of the exemplary embodiments.

A numerical range indicated using "to" in the present disclosure indicates a range that includes numerical values written in the front and rear of "to" as a minimum value and a maximum value, respectively.

With regard to numerical ranges described stepwise in the present disclosure, an upper limit or a lower limit described in one numerical range may be replaced with an upper limit or a lower limit of another numerical range described stepwise. Further, with regard to a numerical range described in the present disclosure, the upper limit or the lower limit of the numerical range may be replaced with values shown in Examples.

In the present disclosure, the term "step" includes not only an independent step but also a step in a case where the intended purpose of the step is achieved even in a case where the step cannot be clearly distinguished from another step.

In the case where an exemplary embodiment is described with reference to the drawings in the present disclosure, the configuration of the exemplary embodiment is not limited to the configuration shown in the drawings. In addition, the sizes of members in each drawing are conceptual, and a relative relationship between the sizes of the members is not limited thereto.

In the present disclosure, each component may include a plurality of types of corresponding substances. In the case where the amount of each component contained in a composition is mentioned in the present disclosure and a plurality of types of substances corresponding to each component are present in the composition, the amount of each component means a total amount of the plurality of types of substances present in the composition unless otherwise specified.

In the present disclosure, "axial direction" of a tubular fixing member means a direction in which a rotation axis of the tubular fixing member extends and "circumferential direction" of the tubular fixing member means a rotation direction of the tubular fixing member.

Polymer Film

A polymer film according to an exemplary embodiment of the present disclosure contains at least one type of polymer selected from the group consisting of a resin and rubber, and fillers dispersed in the polymer. In a case where the polymer film is three-dimensionally analyzed with FIB-SEM, a film thickness of the polymer film is denoted by Tm, and a length of a filler in a film thickness direction of the polymer film is denoted by Lf, a proportion of the number of fillers having Lf/Tm of 0.01 or more and less than 1.0 to the number of all fillers is more than 40% and less than 100%.

A method of three-dimensionally analyzing the polymer film with focused ion beam scanning electron microscopes (FIB-SEM) will be described.

The polymer film is cut into a rectangular parallelepiped having a width of 1 mm, and is embedded in an epoxy resin. Cross-sectional processing is performed on an embedded product with a microtome to form a block cross-section in which a cross-section taken in the film thickness direction is seen. A sample on which the block cross-section is formed is fixed to a sample table of an FIB-SEM instrument (FIB-SEM Helios NanoLab 600i, FEI Company, USA) and deposition processing is performed. FIB processing and SEM observation of the block cross-section are repeated with the FIB-SEM instrument, so that two-dimensional stacking images are obtained. The FIB processing and the SEM observation are repeated until at least 30 fillers are observed. The SEM observation is performed at a magnification ratio where the fillers dispersed in the polymer film can be observed.

The two-dimensional stacking images are input to three-dimensional image analysis software (Avizo-Fire, VSG), so that a three-dimensional image is formed. Values of Lf, Tm, the angle θ, the aspect ratio, and the volume of each filler are acquired from the formed three-dimensional image. Then, a proportion of the number of fillers having Lf/Tm of 0.01 or more and less than 1.0 to the number of all fillers is obtained. Further, average values of angles θ, aspect ratios, and volumes of the fillers having Lf/Tm of 0.01 or more and less than 1.0 are calculated.

Methods of obtaining Lf, Tm, and the angle θ of the filler are as follows.

FIG. 1 is a schematic diagram illustrating Lf, Tm, and the angle θ of the filler. FIG. 1 shows a state where fillers 20 are dispersed in a polymer film 10.

Lf denotes the length of the filler 20 in a film thickness direction of the polymer film 10.

Tm is a film thickness of the polymer film 10 that is on an identical straight line as Lf and is measured for each of the fillers 20.

The angle θ is an angle between a major axis of the filler 20 and a plane direction of the polymer film 10.

A method of obtaining an aspect ratio of a filler is as follows.

In a state where an X axis among an X axis, a Y axis, and a Z axis corresponds to the direction of the major axis of the filler, a filler length along each of the X axis, the Y axis, and the Z axis is measured. Among the filler lengths along the three axes, a ratio of the longest length (the filler length along the X axis, that is, a length along the major axis) to the shortest length (the filler length along the Y axis or the filler length along the Z axis) is defined as an aspect ratio.

Lf/Tm of 0.01 or more means that a filler is disposed in the film thickness direction of the polymer film. Lf/Tm of less than 0.01 means that a filler is substantially parallel to the plane direction of the polymer film.

Hereinafter, "filler having Lf/Tm of 0.01 or more and less than 1.0" is referred to as "filler (S)".

Since a proportion of the number of the fillers (S) to the number of all the fillers is more than 40%, the polymer film according to the exemplary embodiment of the present disclosure is excellent in thermal conductivity in the film thickness direction. From this viewpoint, a proportion of the number of the fillers (S) to the number of all the fillers is more than 40%, and is, for example, preferably 50% or more, more preferably 60% or more, and still more preferably 65% or more.

On the other hand, in a case where a proportion of the number of the fillers (S) to the number of all the fillers is 100% (that is, all the fillers are the fillers (S)), the thermal conductivity of the polymer film in the plane direction is lowered and temperature unevenness may occur in the plane direction. From this viewpoint, a proportion of the number of the fillers (S) to the number of all the fillers is less than 100%, and is, for example, preferably 95% or less and more preferably 90% or less.

From the viewpoint of excellent thermal conductivity in the film thickness direction and the suppression of temperature unevenness in the plane direction, an average value of Lf/Tm of all the fillers is, for example, preferably 0.01 or more and 0.99 or less, more preferably 0.03 or more and 0.98 or less, and still more preferably 0.05 or more and 0.97 or less.

From the viewpoint of excellent thermal conductivity in the film thickness direction, an average value of the aspect ratios of the fillers (S) is, for example, preferably 15 or more and 500 or less, more preferably 20 or more and 450 or less, and still more preferably 25 or more and 400 or less.

From the viewpoint of excellent thermal conductivity in the film thickness direction, an average value of the angles θ of the fillers (S) is, for example, preferably 10 degrees or more and less than 80 degrees, more preferably 15 degrees or more and 78 degrees or less, and still more preferably 20 degrees or more and 75 degrees or less.

From the viewpoint of excellent thermal conductivity in the film thickness direction, an average value of the volumes of the fillers (S) is, for example, preferably 0.1 $\mu m^3$ or more and 500 $\mu m^3$ or less, more preferably 1 $\mu m^3$ or more and 490 $\mu m^3$ or less, and still more preferably 1.5 $\mu m^3$ or more and 480 $\mu m^3$ or less.

From the viewpoint of thermal conductivity, it is preferable that, for example, at least one selected from the group consisting of a carbon material, aluminum nitride, boron nitride, and silicon carbide is used as a material of the filler. One type of filler may be used alone, or two or more types of fillers may be mixed and used.

Examples of the filler of the exemplary embodiment include carbon fibers, such as carbon nanofibers and carbon nanotubes.

Examples of the filler of the exemplary embodiment include at least one type of ceramic fibers or ceramic particles selected from the group consisting of aluminum nitride, boron nitride, and silicon carbide.

Examples of the filler of the exemplary embodiment include metal oxide particles, such as alumina, boehmite (alumina monohydrate), silica, titania, zirconia, magnesium oxide, tin oxide, zinc oxide, and barium oxide.

The shape of the filler may be any of a particle shape, a fibrous shape, a plate shape, a flake shape, and the like.

From the viewpoint of a relatively long heat conduction path per filler, it is preferable that the filler is, for example, a fibrous filler. An average length of the fibrous filler is, for example, 5 μm or more and 100 μm or less.

The polymer film according to the exemplary embodiment of the present disclosure includes at least one type of polymer selected from the group consisting of a resin and rubber. Examples of the polymer include a polyimide resin, a polyamide resin, a polyamide-imide resin, a thermotropic liquid crystalline polymer, a fluororesin, a silicone resin, fluororubber, silicone rubber, fluorosilicone rubber, and the like. One type of polymer may be used alone, or two or more types of polymers may be mixed and used. From the viewpoint of the heat resistance of the polymer film, it is preferable that, for example, a polyimide resin or silicone rubber is used.

From the viewpoint of a balance between flexibility, durability, thermal conductivity, and the like, a mass ratio between the polymer and all the fillers contained in the polymer film is, for example, preferably 40:60 to 95:5, more preferably 50:50 to 90:10, and still more preferably 60:40 to 85:15.

An average thickness of the polymer film according to the exemplary embodiment of the present disclosure may be set depending on an intended use, and is, for example, 10 µm or more and 1000 µm or less, 15 µm or more and 800 µm or less, and 20 µm or more and 500 µm or less.

The polymer film according to the exemplary embodiment of the present disclosure may be a flat film or may be a tubular film. Examples of the intended use of the polymer film according to the exemplary embodiment of the present disclosure include a sheet that is installed on an electronic device for the purpose of absorbing or dissipating heat, a tubular fixing member of an image forming apparatus, and the like.

Examples of a method of manufacturing the polymer film according to the exemplary embodiment of the present disclosure include a manufacturing method that sequentially performs the following steps (1) to (3).

Step (1): A polymer and fillers are mixed to prepare coating liquid. A solvent or a dispersion medium is also mixed as needed.

Step (2): A base body is coated with the coating liquid and the coating liquid is dried to form a coating film.

Step (3): The coating film is fired to obtain a polymer film.

In a case where a cylindrical mold is used as the base body of Step (2), a tubular polymer film can be manufactured.

Examples of a method of controlling a proportion of the number of the fillers (S), which are disposed in the film thickness direction of the polymer film, to more than 40% include the following method.

In a case where the polymer and the fillers are mixed in Step (1), stirring conditions are set to be relatively mild so that the fillers are not shredded.

The viscosity of the coating liquid to be prepared in Step (1) is set to be relatively high.

In a case where the base body is coated with the coating liquid in Step (2), a blade pressure is set to be relatively low.

Tubular Fixing Member

A tubular fixing member according to an exemplary embodiment of the present disclosure includes the polymer film according to the exemplary embodiment of the present disclosure.

The tubular fixing member according to the exemplary embodiment of the present disclosure may be a member consisting of only the polymer film according to the exemplary embodiment of the present disclosure, may be a member in which the polymer film according to the exemplary embodiment of the present disclosure and another film are laminated, or may be a member in which a plurality of polymer films according to the exemplary embodiment of the present disclosure are laminated. In a case where a plurality of polymer films according to the exemplary embodiment of the present disclosure are laminated, the plurality of polymer films may be identical to each other or different from each other in terms of components and/or composition.

From the viewpoint of durability and thermal conductivity, an average thickness of the polymer film included in the tubular fixing member is, for example, preferably 20 µm or more and 300 µm or less, more preferably 30 µm or more and 250 µm or less, and still more preferably 40 µm or more and 200 µm or less.

The average thickness of the polymer film included in the tubular fixing member is an arithmetic average value of the thicknesses of the film that are measured by an eddy current film thickness meter at a total of 40 points, that is, at 10 points arranged at regular intervals in the axial direction of the tubular fixing member at each of four points arranged at intervals of 90° in the circumferential direction.

The tubular fixing member according to the exemplary embodiment of the present disclosure may include a release layer serving as an outer circumferential surface on the outer circumferential side of the polymer film according to the exemplary embodiment of the present disclosure.

It is desired that the release layer contains, for example, a release material having heat resistance. Examples of the release material having heat resistance include a fluororesin. Examples of the fluororesin include a tetrafluoroethylene-perfluoroalkyl vinyl ether copolymer (PFA), polytetrafluoroethylene (PTFE), a tetrafluoroethylene-hexafluoropropylene copolymer (FEP), polyethylene tetrafluoroethylene (ETFE), polyvinylidene fluoride (PVDF), polychlorotrifluoroethylene (PCTFE), vinyl fluoride (PVF), and the like.

Various additives may be contained in the release layer. Examples of the additives include fillers (calcium carbonate and the like), functional fillers (alumina and the like), softeners (paraffin and the like), processing aids (stearic acid and the like), anti-aging agents (amine and the like), cross-linking agents, and the like.

An average thickness of the release layer is, for example, preferably 5 µm or more and 30 µm or less, more preferably 10 µm or more and 25 µm or less, and still more preferably 15 m or more and 20 µm or less.

Examples of the tubular fixing member according to the exemplary embodiment of the present disclosure include an aspect in which a substrate layer, an elastic layer, and a release layer are laminated in this order and at least one of the substrate layer or the elastic layer is the polymer film according to the exemplary embodiment of the present disclosure.

Examples of a preferable aspect of the exemplary embodiment include an aspect in which the substrate layer is the polymer film according to the exemplary embodiment of the present disclosure containing a resin and/or the elastic layer is the polymer film according to the exemplary embodiment of the present disclosure containing rubber.

From the viewpoint of durability and thermal conductivity, an average thickness of the substrate layer is, for example, preferably 20 µm or more and 200 µm or less, more preferably 30 µm or more and 150 µm or less, and still more preferably 40 µm or more and 100 µm or less.

From the viewpoint of durability and thermal conductivity, an average thickness of the elastic layer is, for example, preferably 30 µm or more and 300 µm or less, more preferably 50 µm or more and 250 µm or less, and still more preferably 80 µm or more and 200 µm or less.

Examples of the shape of the tubular fixing member according to the exemplary embodiment of the present disclosure include a cylindrical shape and a belt shape.

The tubular fixing member according to the exemplary embodiment of the present disclosure may be a fixing belt or may be a fixing roller.

Fixing Device

A fixing device according to an exemplary embodiment of the present disclosure includes a first rotating body and a second rotating body that is disposed in contact with an outer surface of the first rotating body, and causes a recording medium in which a toner image is formed on a surface to pass through a contact portion between the first rotating body and the second rotating body to fix the toner image to the recording medium. At least one of the first rotating body or the second rotating body is a rotating body that applies heat to the recording medium and is the tubular fixing member according to the exemplary embodiment of the present disclosure.

Examples of the fixing device according to the exemplary embodiment of the present disclosure include a first exemplary embodiment and a second exemplary embodiment.

A fixing device according to the first exemplary embodiment includes a heating roller and a pressure belt, and at least the heating roller is the tubular fixing member according to the exemplary embodiment of the present disclosure.

A fixing device according to the second exemplary embodiment includes a heating belt and a pressure roller, and at least the heating belt is the tubular fixing member according to the exemplary embodiment of the present disclosure.

First Exemplary Embodiment

Figure 2:
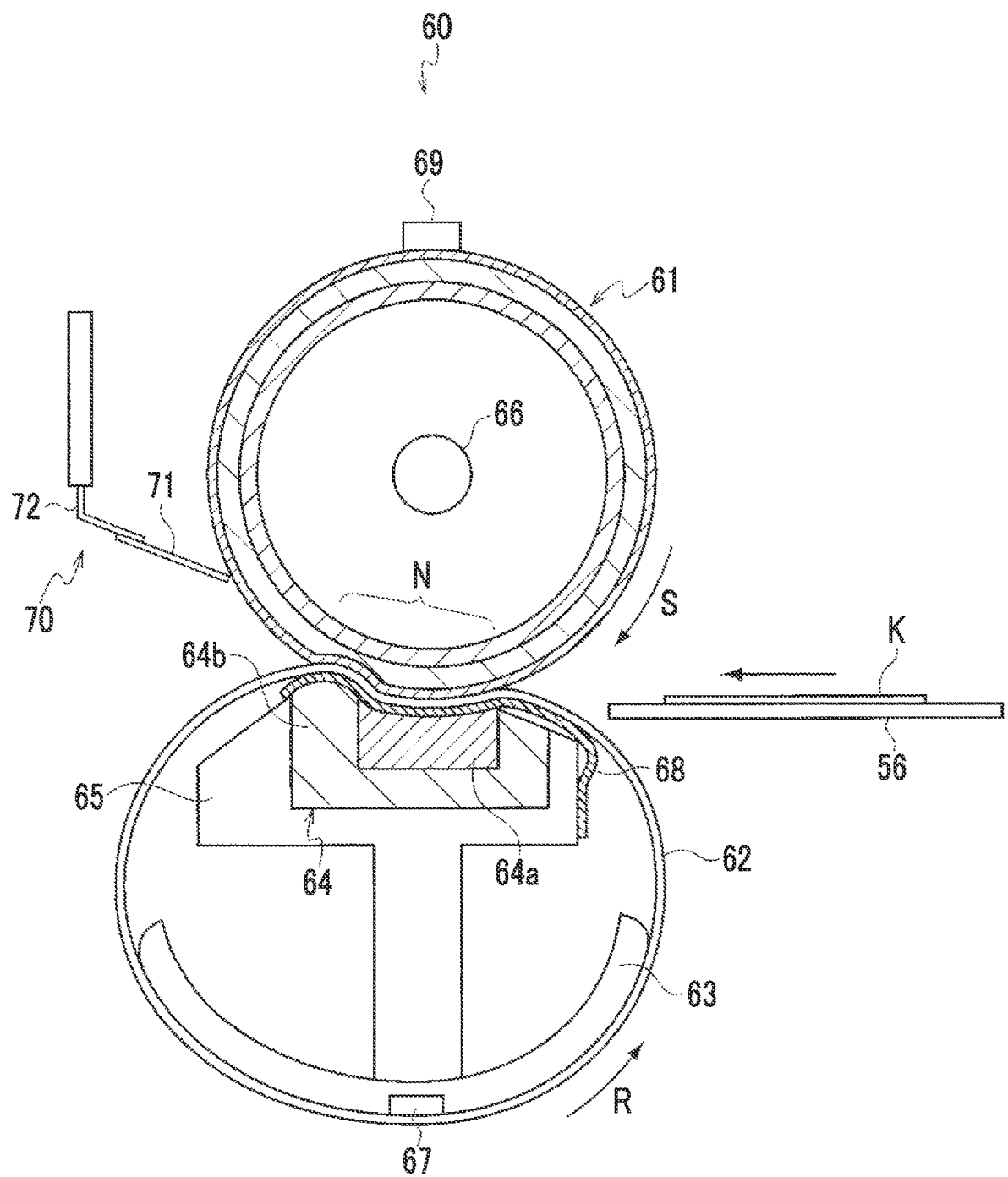
FIG. 2 is a schematic configuration diagram showing an example of a fixing device according to a first exemplary embodiment of the present disclosure.

FIG. 2 is a schematic diagram showing a fixing device 60 according to a first exemplary embodiment.

The fixing device 60 includes a heating roller 61 (an example of the first rotating body) and a pressure belt 62 (an example of the second rotating body).

A halogen lamp 66 (an example of a heating device) is disposed in the heating roller 61. A temperature-sensitive element 69 is disposed in contact with the surface of the heating roller 61. The lighting of the halogen lamp 66 is controlled on the basis of a temperature value measured by the temperature-sensitive element 69, so that the surface temperature of the heating roller 61 is maintained at a target set temperature (for example, 150° C.).

The pressure belt 62 is rotatably supported by a pressing pad 64 and a belt traveling guide 63 that are disposed inside the pressure belt 62.

The pressing pad 64 presses the pressure belt 62 against the heating roller 61. The pressure belt 62 is pressed against the heating roller 61 by the pressing pad 64, so that a nip region N (nip portion) is formed.

The pressing pad 64 includes a nip member 64a and a nip member 64b. The nip member 64a is disposed on the entrance side of the nip region N to ensure a wide nip region N. The nip member 64b is disposed on the exit side of the nip region N to cause strain on the heating roller 61 and to facilitate the peeling of a recording medium.

A sheet-like sliding member 68 is disposed between the pressing pad 64 and the pressure belt 62 to reduce sliding resistance between the inner circumferential surface of the pressure belt 62 and the pressing pad 64. The pressing pad 64 and the sliding member 68 are held by a holding member 65 made of metal. The belt traveling guide 63 is mounted on the holding member 65. A lubricant supply device 67, which is a device for supplying a lubricant (oil) to the inner circumferential surface of the pressure belt 62, is mounted on the belt traveling guide 63.

A peeling member 70 is an auxiliary member for peeling off a recording medium from the fixing device 60, and is disposed on the downstream side of the nip region N. The peeling member 70 includes a peeling claw 71 and a holding member 72. The peeling claw 71 is held at a position close to the heating roller 61 by the holding member 72.

The heating roller 61 is rotationally driven by a drive motor (not shown). The heating roller 61 is rotated in a direction of an arrow S by the drive motor, and the pressure belt 62 is rotated in a direction of an arrow R while following the rotation of the heating roller 61. A sheet K (an example of a recording medium) including an unfixed toner image is guided by a fixing entrance guide 56, and is transported to the nip region N. When the sheet K passes through the nip region N, the toner image on the sheet K is fixed by pressure and heat.

Second Exemplary Embodiment

Figure 3:
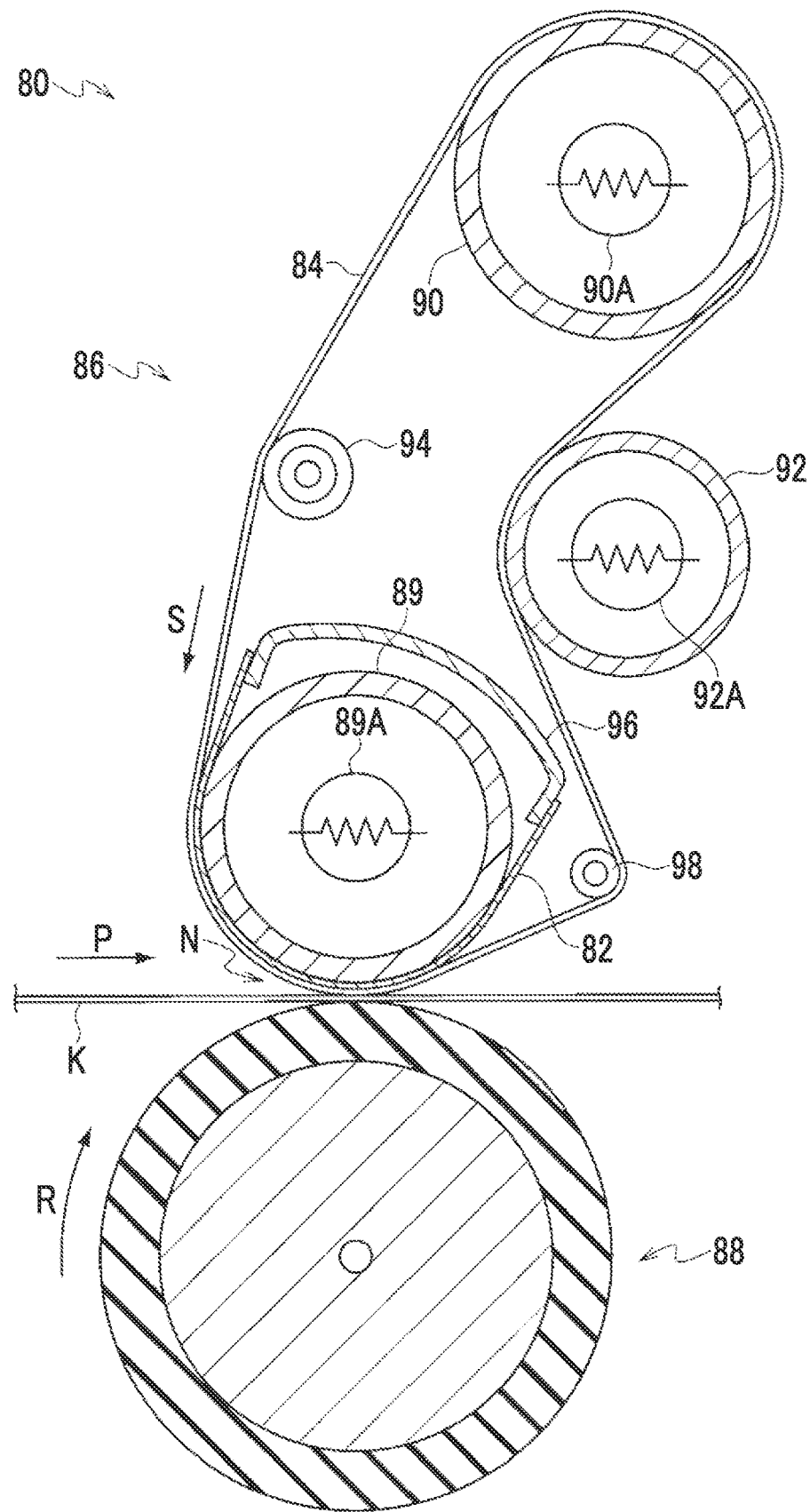
FIG. 3 is a schematic configuration diagram showing an example of a fixing device according to a second exemplary embodiment of the present disclosure.

FIG. 3 is a schematic diagram showing a fixing device 80 according to a second exemplary embodiment.

The fixing device 80 includes a fixing belt module 86 that includes a heating belt 84 (an example of the first rotating body), and a pressure roller 88 (an example of the second rotating body) that is disposed to be pressed against the heating belt 84 (fixing belt module 86).

A nip region N (nip portion) is formed at a contact portion between the heating belt 84 (fixing belt module 86) and the pressure roller 88.

The fixing belt module 86 includes a heating belt 84, a heating pressing roller 89, a support roller 90, a support roller 92, a posture correction roller 94, and a support roller 98. The heating belt 84 is wound around the heating pressing roller 89 and the support roller 90. The heating pressing roller 89 is rotationally driven by a drive motor (not shown), and presses the heating belt 84 against the pressure roller 88 from the inner circumferential surface of the heating belt 84. The support roller 92 is disposed outside the heating belt 84, and defines a circumferential path of the heating belt 84. The posture correction roller 94 corrects the posture of the heating belt 84 between the support roller 90 and the heating pressing roller 89, and suppresses the meandering of the heating belt 84. The support roller 98 applies tension to the heating belt 84 from the inner circumferential surface of the heating belt 84 on the downstream side of the nip region N.

A sheet-like sliding member 82 is disposed between the heating belt 84 and the heating pressing roller 89 to reduce sliding resistance between the inner circumferential surface of the heating belt 84 and the heating pressing roller 89. The sliding member 82 is disposed in a state where both ends of the sliding member 82 are supported by a support member 96.

A halogen heater 89A (an example of a heating device) is disposed in the heating pressing roller 89, and heats the heating belt 84 from the inner circumferential surface side of the heating belt 84.

A halogen heater 90A (an example of a heating device) is disposed in the support roller 90, and heats the heating belt 84 from the inner circumferential surface side of the heating belt 84.

A halogen heater 92A (an example of a heating device) is disposed in the support roller 92, and heats the heating belt 84 from the outer circumferential surface side of the heating belt 84.

The pressure roller 88 is rotatably supported, and is provided to be pressed against a portion of the heating belt 84, which is wound around the heating pressing roller 89, by a biasing unit (not shown). The heating belt 84 is rotationally moved in a direction of an arrow S as the heating pressing roller 89 is rotationally driven, and the pressure roller 88 is rotationally moved in a direction of an arrow R while following the rotational movement of the heating belt 84.

A sheet K (an example of a recording medium) including an unfixed toner image is transported in a direction of an arrow P, and is guided to the nip region N of the fixing device 80. When the sheet K passes through the nip region N, the toner image on the sheet K is fixed by pressure and heat.

Image Forming Apparatus

An image forming apparatus according to an exemplary embodiment of the present disclosure includes an image holding body, a charging device that charges a surface of the image holding body, an electrostatic latent image forming device that forms an electrostatic latent image on the charged surface of the image holding body, a developing device that develops the electrostatic latent image formed on the surface of the image holding body with a developer containing toner to form a toner image, a transfer device that transfers the toner image onto a surface of a recording medium, and the fixing device according to the exemplary embodiment of the present disclosure that fixes the toner image to the recording medium. The fixing device may be a cartridge that can be attached to and detached from the image forming apparatus.

Figure 4:
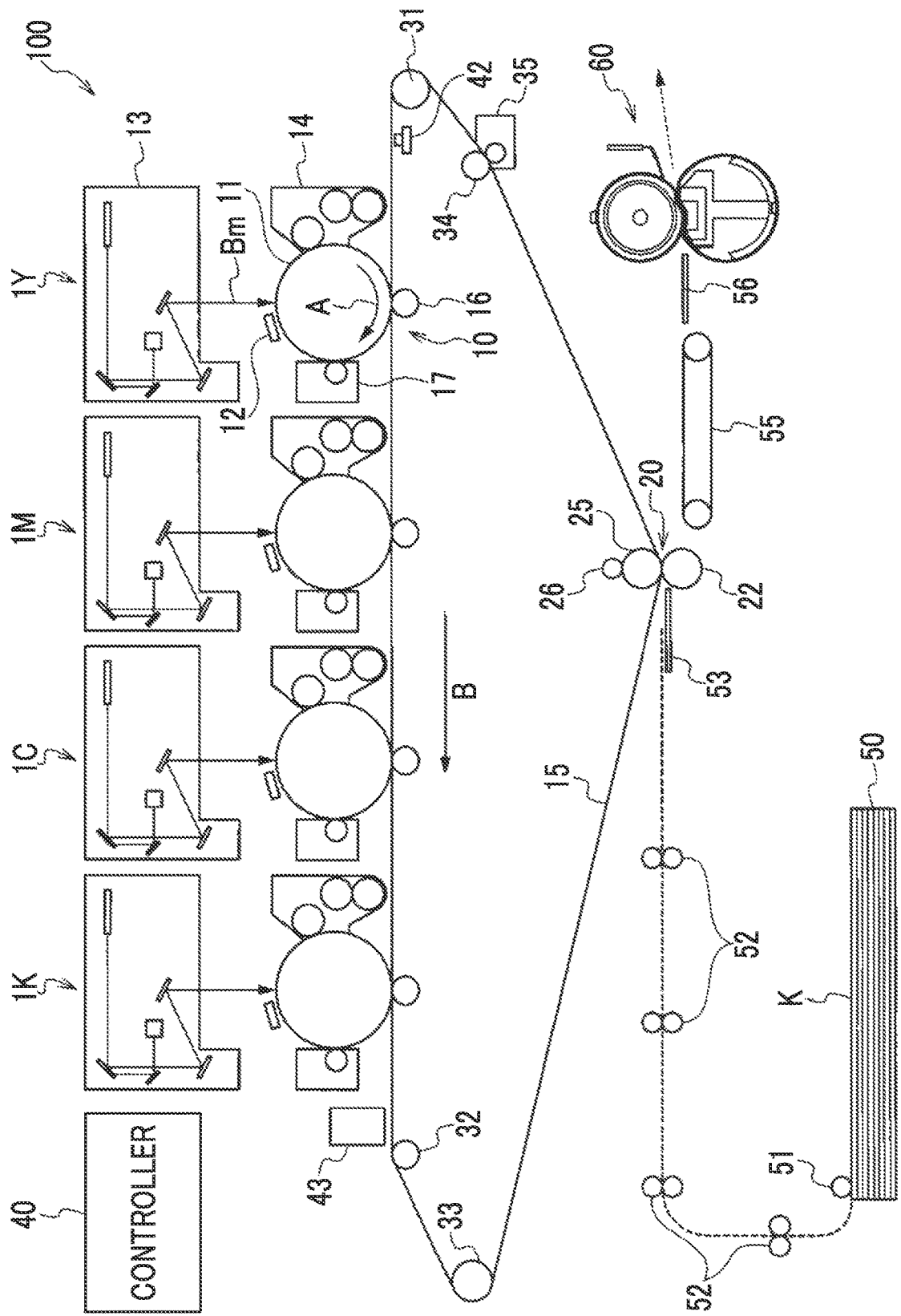
FIG. 4 is a schematic configuration diagram showing an example of an image forming apparatus according to an exemplary embodiment of the present disclosure.

FIG. 4 is a schematic diagram showing the configuration of the image forming apparatus 100 according to the present exemplary embodiment. The image forming apparatus 100 includes the fixing device 60 according to the first exemplary embodiment described above. The image forming apparatus 100 may include the fixing device 80 according to the second exemplary embodiment described above instead of the fixing device 60.

The image forming apparatus 100 is an intermediate transfer image forming apparatus that is generally called a tandem-type image forming apparatus. The image forming apparatus 100 includes image forming units 1Y, 1M, 1C, and 1K in which toner images having the respective colors are formed by an electrophotographic method, primary transfer units 10 that sequentially transfer (primarily transfer) the toner images having the respective colors onto an intermediate transfer belt 15, a secondary transfer unit 20 that collectively transfers (secondarily transfers) superimposed toner images transferred onto the intermediate transfer belt 15 to a sheet K, which is a recording medium, the fixing device 60 that fixes the secondarily transferred images onto the sheet K, and a controller 40 that controls the operation of each device (each unit).

The image forming units 1Y, 1M, 1C, and 1K are substantially linearly arranged in the order of 1Y (unit for yellow), 1M (unit for magenta), 1C (unit for cyan), and 1K (unit for black) from the upstream side of the intermediate transfer belt 15.

Each of the image forming units 1Y, 1M, 1C, and 1K includes a photoreceptor 11 (an example of the image holding body). The photoreceptor 11 is rotated in a direction of an arrow A.

A charging unit 12 (an example of a charging device), a laser exposure unit 13 (an example of an electrostatic latent image forming device), a developing unit 14 (an example of a developing device), a primary transfer roller 16, and a photoreceptor cleaner 17 are sequentially arranged around the photoreceptor 11 in a rotation direction of the photoreceptor 11.

The charging unit 12 charges the surface of the photoreceptor 11.

The laser exposure unit 13 emits an exposure beam Bm to form an electrostatic latent image on the photoreceptor 11.

The developing unit 14 stores toner having each color, and changes the electrostatic latent image formed on the photoreceptor 11 into a visible image with the toner.

The primary transfer roller 16 transfers the toner image formed on the photoreceptor 11 onto the intermediate transfer belt 15 at the primary transfer unit 10.

The photoreceptor cleaner 17 removes residual toner remaining on the photoreceptor 11.

The intermediate transfer belt 15 is a belt consisting of a material in which an antistatic agent, such as carbon black, is added to a resin, such as polyimide or polyamide. The intermediate transfer belt 15 has a volume resistivity of, for example, $1 \times 10^6$ Ω·cm or more and $1 \times 10^{14}$ Ω·cm or less and has a thickness of, for example, 0.1 mm.

The intermediate transfer belt 15 is supported by a drive roller 31, a support roller 32, a tension applying roller 33, a back roller 25, and a cleaning back roller 34, and is driven to circulate (is rotated) in a direction of an arrow B according to the rotation of the drive roller 31.

The drive roller 31 is driven by a motor (not shown) having an excellent constant speed property and rotates the intermediate transfer belt 15.

The support roller 32 supports the intermediate transfer belt 15, which substantially linearly extends in an arrangement direction of four photoreceptors 11, together with the drive roller 31.

The tension applying roller 33 applies constant tension to the intermediate transfer belt 15, and functions as a correction roller that suppresses the meandering of the intermediate transfer belt 15.

The back roller 25 is provided in the secondary transfer unit 20, and the cleaning back roller 34 is provided in a cleaning unit that scrapes off residual toner remaining on the intermediate transfer belt 15.

The primary transfer roller 16 is disposed in pressure contact with the photoreceptor 11 with the intermediate transfer belt 15 interposed between the photoreceptor 11 and the primary transfer roller 16, and forms the primary transfer unit 10.

A voltage (primary transfer bias) having a polarity opposite to the charging polarity of the toner (referred to as a negative polarity. The same applies hereinafter.) is applied to the primary transfer roller 16. Accordingly, the toner images formed on the respective photoreceptors 11 are sequentially electrostatically attracted to the intermediate transfer belt 15, so that the superimposed toner images are formed on the intermediate transfer belt 15.

The primary transfer roller 16 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The primary transfer roller 16 has a volume resistivity of, for example, $1 \times 10^{7.5}$ Ω·cm or more and $1 \times 10^{8.5}$ Ω·cm or less.

A secondary transfer roller 22 is disposed in pressure contact with the back roller 25 with the intermediate transfer belt 15 interposed between the back roller 25 and the secondary transfer roller 22, and forms the secondary transfer unit 20.

The secondary transfer roller 22 forms a secondary transfer bias between the back roller 25 and the secondary transfer roller 22, and secondarily transfers the toner images onto the sheet K (recording medium) transported to the secondary transfer unit 20.

The secondary transfer roller 22 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The secondary transfer roller 22 has a volume resistivity of, for example, $1\times10^{7.5}$ Ω·cm or more and $1\times10^{8.5}$ Ω·cm or less.

The back roller 25 is disposed on the back side of the intermediate transfer belt 15 to form a counter electrode of the secondary transfer roller 22, and forms a transfer electric field between the secondary transfer roller 22 and the back roller 25.

For example, a rubber substrate is covered with a tube made of blended rubber in which carbon is dispersed, so that the back roller 25 is formed. The back roller 25 has a surface resistivity of, for example, $1\times10^7$ Ω/□ or more and $1\times10^{10}$ Ω/□ or less, and has a hardness of, for example, 70° (Asker C manufactured by Kobunshi Keiki Co., Ltd., the same applies hereinafter).

A power feed roller 26 made of metal is disposed in contact with the back roller 25. The power feed roller 26 applies a voltage (secondary transfer bias) having a polarity identical to the charging polarity of the toner (negative polarity) to form a transfer electric field between the secondary transfer roller 22 and the back roller 25.

An intermediate transfer belt cleaner 35 is provided on the downstream side of the secondary transfer unit 20 on the intermediate transfer belt 15 to be freely attachable to and detachable from the intermediate transfer belt 15. The intermediate transfer belt cleaner 35 removes residual toner and paper dust on the intermediate transfer belt 15 after the secondary transfer.

A reference sensor (home position sensor) 42 is provided on the upstream side of the image forming unit 1Y. The reference sensor 42 generates a reference signal that serves as a reference used to take an image formation timing in each image forming unit. The reference sensor 42 recognizes a mark provided on the back side of the intermediate transfer belt 15 and generates a reference signal, and the image forming units 1Y, 1M, 1C, and 1K start to form images according to an instruction given from the controller 40 that recognizes this reference signal.

An image density sensor 43 used to adjust image quality is provided on the downstream side of the image forming unit 1K.

The image forming apparatus 100 includes a sheet storage part 50, a sheet feed roller 51, transport rollers 52, a transport guide 53, a transport belt 55, and a fixing entrance guide 56 as a transport unit for transporting a sheet K.

The sheet storage part 50 stores sheets K on which images are not yet formed.

The sheet feed roller 51 takes out a sheet K stored in the sheet storage part 50.

The transport rollers 52 transport the sheet K that is taken out by the sheet feed roller 51.

The transport guide 53 sends the sheet K, which is transported by the transport rollers 52, to the secondary transfer unit 20.

The transport belt 55 transports the sheet K, onto which images are transferred at the secondary transfer unit 20, to the fixing device 60.

The fixing entrance guide 56 guides the sheet K to the fixing device 60.

A method of forming an image using the image forming apparatus 100 will be described.

In the image forming apparatus 100, image data output from an image reading device (not shown), a computer (not shown), or the like are subjected to image processing via an image processing device (not shown) and work for forming images is performed by the image forming units 1Y, 1M, 1C, and 1K.

In the image processing device, image processing, such as shading correction, misregistration correction, brightness/color space conversion, gamma correction, frame removal or color editing, and movement editing, is performed on input reflectance data. Image data on which the image processing is performed are converted into coloring material gradation data of four colors, that is, Y, M, C, and K, and are output to the laser exposure units 13.

The laser exposure unit 13 irradiates each of the photoreceptors 11 of the image forming units 1Y, 1M, 1C, and 1K with an exposure beam Bm according to the input coloring material gradation data.

The surface of each of the photoreceptors 11 of the image forming units 1Y, 1M, 1C, and 1K is charged by the charging unit 12 and is then scanned and exposed by the laser exposure unit 13, so that an electrostatic latent image is formed. The electrostatic latent image formed on each photoreceptor 11 is developed as a toner image having each color by each image forming unit.

The toner image formed on each of the photoreceptors 11 of the image forming units 1Y, 1M, 1C, and 1K is transferred onto the intermediate transfer belt 15 at the primary transfer unit 10 where each photoreceptor 11 and the intermediate transfer belt 15 are in contact with each other. At the primary transfer units 10, a voltage (primary transfer bias) having a polarity opposite to the charging polarity of the toner (negative polarity) is applied to the intermediate transfer belt 15 by the primary transfer rollers 16 and toner images are sequentially superimposed and transferred onto the intermediate transfer belt 15.

The toner images primarily transferred onto the intermediate transfer belt 15 are transported to the secondary transfer unit 20 with the movement of the intermediate transfer belt 15.

At a timing when the toner images reach the secondary transfer unit 20, a sheet K stored in the sheet storage part 50 is transported by the sheet feed roller 51, the transport rollers 52, and the transport guide 53, is fed to the secondary transfer unit 20, and is sandwiched between the intermediate transfer belt 15 and the secondary transfer roller 22.

Then, the toner images on the intermediate transfer belt 15 are electrostatically transferred (secondarily transferred) onto the sheet K at the secondary transfer unit 20 where a transfer electric field is formed.

The sheet K onto which the toner images are electrostatically transferred is peeled off from the intermediate transfer belt 15 by the secondary transfer roller 22 and is transported to the fixing device 60 by the transport belt 55.

The sheet K transported to the fixing device 60 is heated and pressed by the fixing device 60, so that the unfixed toner images are fixed.

An image is formed on the recording medium by the image forming apparatus 100 through the above-mentioned steps.

EXAMPLES

The exemplary embodiments of the present disclosure will be described in detail below using examples, but the exemplary embodiments of the present disclosure are not limited to these examples at all.

In the following description, all of "part" and "%" are based on mass unless otherwise specified.

In the following description, synthesis, processing, manufacture, and the like are performed at a room temperature (25° C.±3C) unless otherwise specified.

Manufacture of Polymer Film

Example 1

A polyamic acid solution (TX-HMM, Unitika, Ltd.) and carbon nanotubes are mixed and kneaded with a triple roll mill to prepare coating liquid (1). The polyamic acid solution and the carbon nanotubes are mixed in an amount such that a mass ratio between a solid content in a case where the polyamic acid solution is cured and the carbon nanotubes is 85:15. In a case where the polyamic acid solution and the carbon nanotubes are kneaded, distances between roll mills and the rotational speeds of the roll mills are adjusted to control a state where the carbon nanotubes are dispersed.

An outer circumferential surface of a cylindrical mold (a diameter of 30 mm) made of aluminum is coated with the coating liquid (1), and the coating liquid (1) is dried for 80 minutes at a temperature of 100° C. The amount of coating liquid (1) used to coat the cylindrical mold is adjusted such that the film thickness of a polymer film reaches a thickness shown in Table 1. After that, the cylindrical mold including the coating film is displaced in a heating furnace and is heated for 40 minutes at a temperature of 380° C. to fire the polymer film. The cylindrical mold under the polymer film is pulled out to obtain a tubular polymer film.

Examples 2 to 9 and Comparative Examples 1 and 3

Tubular polymer films are manufactured in a manner identical to the manner of Example 1 except that the types and/or lengths of fillers are changed as shown in Table 1. In a case where the polyamic acid solution and fillers are kneaded, distances between the roll mills and the rotational speeds of the roll mills are adjusted to control a state where the fillers are dispersed.

Example 10

Liquid silicone rubber (two-liquid type, X-34-2826-A/B, Shin-Etsu Chemical Co., Ltd.) and carbon nanotubes are mixed and kneaded with a triple roll mill to prepare coating liquid (10). The liquid silicone rubber and the carbon nanotubes are mixed in an amount such that a mass ratio between a solid content in a case where the liquid silicone rubber is cured and the carbon nanotubes is 85:15. In a case where the liquid silicone rubber and the carbon nanotubes are kneaded, distances between roll mills and the rotational speeds of the roll mills are adjusted to control a state where the carbon nanotubes are dispersed.

An outer circumferential surface of a cylindrical mold (a diameter of 30 mm) made of aluminum is coated with the coating liquid (10), and the coating liquid (10) is dried for 15 minutes at a temperature of 115° C. The amount of coating liquid (10) used to coat the cylindrical mold is adjusted such that the film thickness of a polymer film reaches a thickness shown in Table 1. After that, the cylindrical mold including the coating film is displaced in a heating furnace and is heated for 2 hours at a temperature of 200° C. to fire the polymer film. The cylindrical mold under the polymer film is pulled out to obtain a tubular polymer film.

Examples 11 to 13 and Comparative Example 2

Tubular polymer films are manufactured in a manner identical to the manner of Example 10 except that the types and/or lengths of fillers are changed as shown in Table 1. In a case where the liquid silicone rubber and the carbon nanotubes are kneaded, distances between roll mills and the rotational speeds of the roll mills are adjusted to control a state where the carbon nanotubes are dispersed.

Cross-Section Analysis of Polymer Film

A rectangular parallelepiped of which three sides correspond to an axial direction, a circumferential direction, and a film thickness direction and which has a length of 1 mm in the circumferential direction and is long in the axial direction is cut out from a middle portion of the tubular polymer film in an axial direction, and is embedded in an epoxy resin. Cross-sectional processing is performed on an embedded product with a microtome to form a block cross-section in which a cross-section taken in the film thickness direction is seen. A sample on which the block cross-section is formed is fixed to a sample table of an FIB-SEM instrument (FIB-SEM Helios NanoLab 600i, FEI Company, USA) and deposition processing is performed. FIB processing and SEM observation of the block cross-section are repeated with the FIB-SEM instrument, so that two-dimensional stacking images are obtained. The FIB processing and the SEM observation are repeated until at least 30 fillers are observed. The SEM observation is performed at a magnification ratio where the fillers dispersed in the polymer film can be observed.

The two-dimensional stacking images are input to three-dimensional image analysis software (Avizo-Fire, VSG), so that a three-dimensional image is formed. Values of Lf, Tm, the angle θ, the aspect ratio, and the volume of each filler are acquired from the formed three-dimensional image. A proportion of the number of fillers having Lf/Tm of 0.01 or more and less than 1.0 is obtained. Average values of angles θ, aspect ratios, and volumes of the fillers having Lf/Tm of 0.01 or more and less than 1.0 are calculated. These values are shown in Table 1.

Thermal Conductivity of Polymer Film

The tubular polymer film is cut into a square shape having a length of 2 mm in the axial direction and a length of 2 mm in the circumferential direction, and this cut polymer film is used as a sample for measurement. The thermal diffusivity of the sample is measured at a room temperature (25° C.±3C) using a thermal diffusivity measuring device ai-phase (ai-Phase Co., Ltd.), and the thermal diffusivity, specific heat, and density are multiplied together to calculate the thermal conductivity (W/m·K) of the sample. The calculated thermal conductivity is classified as follows.

A+: 1.3 W/m·K or more

A: 0.8 W/m·K or more and less than 1.3 W/m·K

B: 0.5 W/m·K or more and less than 0.8 W/m·K

C: less than 0.5 W/m·K

Abbreviations in Table 1 have the following meanings.

PI: polyimide resin

Si rubber: silicone rubber

CNT: carbon nanotubes

AlN: aluminum nitride

TABLE 1

| | Material | | | | | Polymer film Cross-section analysis | | | | | | Performance of polymer film Thermal conductivity W/m·K |
|---|---|---|---|---|---|---|---|---|---|---|---|---|
| | | Filler | | | | | Fillers having Lf/Tm of 0.01 or more and less than 1.0 | | | | | |
| | Polymer Type | Type | Average length μm | Average particle size μm | Mass ratio between polymer and fillers | Average film thickness μm | Average of Lf μm | Average of Lf/Tm | Proportion of number % | Average value of aspect ratios | Average value of θ | Average value of volumes μm³ | |
| Example 1 | PI | CNT | 80 | 0.20 | 85:15 | 80 | 77.3 | 0.97 | 85 | 400 | 75 | 2.512 | A+ |
| Example 2 | PI | CNT | 80 | 0.21 | 85:15 | 80 | 40.0 | 0.50 | 70 | 400 | 30 | 2.512 | A+ |
| Example 3 | PI | CNT | 25 | 0.23 | 85:15 | 80 | 4.3 | 0.05 | 65 | 125 | 10 | 0.785 | A |
| Example 4 | PI | CNT | 50 | 0.22 | 85:15 | 50 | 38.3 | 0.77 | 70 | 250 | 50 | 1.57 | A+ |
| Example 5 | PI | CNT | 5 | 0.21 | 85:15 | 25 | 4.8 | 0.19 | 85 | 25 | 75 | 0.157 | A |
| Example 6 | PI | CNT | 5 | 0.20 | 85:15 | 80 | 0.9 | 0.01 | 63 | 25 | 10 | 0.157 | A |
| Example 7 | PI | AlN | 80 | 0.21 | 85:15 | 80 | 40.0 | 0.50 | 70 | 400 | 30 | 2.512 | A+ |
| Example 8 | PI | AlN | 50 | 0.22 | 85:15 | 50 | 38.3 | 0.77 | 70 | 250 | 50 | 1.57 | A+ |
| Example 9 | PI | AlN | 5 | 0.20 | 85:15 | 80 | 0.9 | 0.01 | 63 | 25 | 10 | 0.157 | A |
| Example 10 | Si rubber | CNT | 25 | 2 | 85:15 | 400 | 8.6 | 0.02 | 70 | 12.5 | 20 | 78.5 | A |
| Example 11 | Si rubber | CNT | 38 | 4 | 85:15 | 300 | 19.0 | 0.06 | 61 | 9.5 | 30 | 477.28 | A+ |
| Example 12 | Si rubber | AlN | 5 | 0.20 | 85:15 | 80 | 0.9 | 0.01 | 63 | 25 | 10 | 0.157 | A |
| Example 13 | Si rubber | AlN | 50 | 0.22 | 85:15 | 50 | 38.3 | 0.77 | 70 | 250 | 50 | 1.57 | A+ |
| Comparative example 1 | PI | CNT | 3 | 0.20 | 85:15 | 100 | 0.5 | 0.005 | 40 | 1 | 10 | 21.195 | C |
| Comparative example 2 | Si rubber | CNT | 3 | 0.20 | 85:15 | 150 | 0.5 | 0.003 | 40 | 1 | 10 | 21.195 | C |
| Comparative example 3 | PI | CNT | 25 | 2 | 97:3 | 400 | 8.6 | 0.02 | 35 | 12.5 | 20 | 78.5 | C |

The polymer film, the tubular fixing member, the fixing device, and the image forming apparatus according to the exemplary embodiments of the present disclosure include the following aspects.

(((1)))

A polymer film comprising:
at least one type of polymer selected from the group consisting of a resin and rubber; and
fillers dispersed in the polymer,
wherein in a case where the polymer film is three-dimensionally analyzed with FIB-SEM, a film thickness of the polymer film is denoted by Tm, and a length of the filler in a film thickness direction of the polymer film is denoted by Lf, a proportion of the number of fillers having Lf/Tm of 0.01 or more and less than 1.0 to the number of all the fillers is more than 40% and less than 100%.

(((2)))

The polymer film according to (((1))),
wherein an average value of aspect ratios of the fillers having Lf/Tm of 0.01 or more and less than 1.0 is 15 or more and 500 or less.

(((3)))

The polymer film according to (((1))),
wherein an average value of aspect ratios of the fillers having Lf/Tm of 0.01 or more and less than 1.0 is 25 or more and 400 or less.

(((4)))

The polymer film according to any one of (((1))) to (((3))),
wherein an average value of angles θ between major axes of the fillers having Lf/Tm of 0.01 or more and less than 1.0 and a plane direction of the polymer film is 10 degrees or more and less than 80 degrees.

(((5)))

The polymer film according to any one of (((1))) to (((3))),
wherein an average value of angles θ between major axes of the fillers having Lf/Tm of 0.01 or more and less than 1.0 and a plane direction of the polymer film is 15 degrees or more and 75 degrees or less.

(((6)))

The polymer film according to any one of (((1))) to (((5))),
wherein an average value of volumes of the fillers having Lf/Tm of 0.01 or more and less than 1.0 is 0.1 μm³ or more and 500 μm³ or less.

(((7)))

The polymer film according to any one of (((1))) to (((6))),
wherein the polymer includes a polyimide resin or silicone rubber.

(((8)))

The polymer film according to any one of (((1))) to (((7))),
wherein a mass ratio between the polymer and all the fillers contained in the polymer film is 40:60 to 95:5.

(((9)))

A tubular fixing member comprising:
the polymer film according to any one of (((1))) to (((8))).

(((10)))

A fixing device comprising:
a first rotating body; and
a second rotating body that is disposed in contact with an outer surface of the first rotating body,
wherein at least one of the first rotating body or the second rotating body is the tubular fixing member according to (((9))), and
a recording medium having a surface on which a toner image is formed passes through a contact portion between the first rotating body and the second rotating body to fix the toner image.

(((11)))

An image forming apparatus comprising:
an image holding body;
a charging device that charges a surface of the image holding body;
an electrostatic latent image forming device that forms an electrostatic latent image on the charged surface of the image holding body;
a developing device that develops the electrostatic latent image formed on the surface of the image holding body with a developer containing toner to form a toner image;
a transfer device that transfers the toner image onto a surface of a recording medium; and
the fixing device according to (((10))) that fixes the toner image to the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polymer film comprising:
at least one type of polymer selected from the group consisting of a resin and rubber; and
fillers dispersed in the polymer,
wherein in a case where the polymer film is three-dimensionally analyzed with FIB-SEM, a film thickness of the polymer film is denoted by Tm, and a length of the filler in a film thickness direction of the polymer film is denoted by Lf, a proportion of the number of fillers having Lf/Tm of 0.01 or more and less than 1.0 to the number of all the fillers is more than 40% and less than 100%.

2. The polymer film according to claim 1,
wherein an average value of aspect ratios of the fillers having Lf/Tm of 0.01 or more and less than 1.0 is 15 or more and 500 or less.

3. A tubular fixing member comprising:
the polymer film according to claim 2.

4. A fixing device comprising:
a first rotating body; and
a second rotating body that is disposed in contact with an outer surface of the first rotating body,
wherein at least one of the first rotating body or the second rotating body is the tubular fixing member according to claim 3, and
a recording medium having a surface on which a toner image is formed passes through a contact portion between the first rotating body and the second rotating body to fix the toner image.

5. The polymer film according to claim 1,
wherein an average value of aspect ratios of the fillers having Lf/Tm of 0.01 or more and less than 1.0 is 25 or more and 400 or less.

6. A tubular fixing member comprising:
the polymer film according to claim 5.

7. A fixing device comprising:
a first rotating body; and
a second rotating body that is disposed in contact with an outer surface of the first rotating body,
wherein at least one of the first rotating body or the second rotating body is the tubular fixing member according to claim 6, and
a recording medium having a surface on which a toner image is formed passes through a contact portion between the first rotating body and the second rotating body to fix the toner image.

8. The polymer film according to claim 1,
wherein an average value of angles θ between major axes of the fillers having Lf/Tm of 0.01 or more and less than 1.0 and a plane direction of the polymer film is 10 degrees or more and less than 80 degrees.

9. A tubular fixing member comprising:
the polymer film according to claim 8.

10. The polymer film according to claim 1,
wherein an average value of angles θ between major axes of the fillers having Lf/Tm of 0.01 or more and less than 1.0 and a plane direction of the polymer film is 15 degrees or more and 75 degrees or less.

11. A tubular fixing member comprising:
the polymer film according to claim 10.

12. The polymer film according to claim 1,
wherein an average value of volumes of the fillers having Lf/Tm of 0.01 or more and less than 1.0 is 0.1 $\mu m^3$ or more and 500 $\mu m^3$ or less.

13. A tubular fixing member comprising:
the polymer film according to claim 12.

14. The polymer film according to according to claim 1,
wherein the polymer includes a polyimide resin or silicone rubber.

15. A tubular fixing member comprising:
the polymer film according to claim 14.

16. The polymer film according to claim 1,
wherein a mass ratio between the polymer and all the fillers contained in the polymer film is 40:60 to 95:5.

17. A tubular fixing member comprising:
the polymer film according to claim 16.

18. A tubular fixing member comprising:
the polymer film according to claim 1.

19. A fixing device comprising:
a first rotating body; and
a second rotating body that is disposed in contact with an outer surface of the first rotating body,
wherein at least one of the first rotating body or the second rotating body is the tubular fixing member according to claim 18, and
a recording medium having a surface on which a toner image is formed passes through a contact portion between the first rotating body and the second rotating body to fix the toner image.

20. An image forming apparatus comprising:
an image holding body;
a charging device that charges a surface of the image holding body;
an electrostatic latent image forming device that forms an electrostatic latent image on the charged surface of the image holding body;
a developing device that develops the electrostatic latent image formed on the surface of the image holding body with a developer containing toner to form a toner image;

a transfer device that transfers the toner image onto a surface of a recording medium; and the fixing device according to claim 19 that fixes the toner image to the recording medium.

\* \* \* \* \*